United States Patent
Vinberg

(10) Patent No.: US 7,342,581 B2
(45) Date of Patent: Mar. 11, 2008

(54) METHOD AND APPARATUS FOR DISPLAYING 3-D STATE INDICATORS

(75) Inventor: Anders Vinberg, Plandome Manor, NY (US)

(73) Assignee: Computer Associates Think, Inc., Islandia, NY (US)

(*) Notice: Subject to any disclaimer, the term of this patent is extended or adjusted under 35 U.S.C. 154(b) by 627 days.

(21) Appl. No.: 09/982,270

(22) Filed: Oct. 17, 2001

(65) Prior Publication Data

US 2002/0138602 A1 Sep. 26, 2002
US 2007/0132760 A9 Jun. 14, 2007

Related U.S. Application Data

(63) Continuation-in-part of application No. 09/949,101, filed on Sep. 7, 2001, which is a continuation of application No. 09/408,213, filed on Sep. 27, 1999, now Pat. No. 6,289,380, which is a continuation of application No. 08/892,919, filed on Jul. 15, 1997, now Pat. No. 5,958,012.

(60) Provisional application No. 60/021,980, filed on Jul. 18, 1996, provisional application No. 60/241,049, filed on Oct. 17, 2000, provisional application No. 60/241,051, filed on Oct. 17, 2000.

(51) Int. Cl.
*G06T 11/20* (2006.01)
*G06F 3/048* (2006.01)
*G06F 15/16* (2006.01)

(52) U.S. Cl. ............... 345/440; 715/836; 715/859; 709/204

(58) Field of Classification Search ............... 715/859, 715/861, 836; 345/440, 440.2; 709/204
See application file for complete search history.

(56) References Cited

U.S. PATENT DOCUMENTS 2,485,343 A * 10/1949 Zuschlag ............... 340/870.11

(Continued)

FOREIGN PATENT DOCUMENTS

EP 0 936 597 A1 8/1999

(Continued)

OTHER PUBLICATIONS

Dupuy et al., *Netmate: A Network Management Environment*, IEEE Network Magazine, pp. 35-43, Mar. 1991.

(Continued)

*Primary Examiner*—Ryan Yang
(74) *Attorney, Agent, or Firm*—Baker Botts L.L.P.

(57) ABSTRACT

A method for presenting a user selected status of an object in a three dimensional graphic display is disclosed. The method includes the step of receiving a request to select a property of an object for display. The method further includes the step of displaying at least one property which may be displayed for the object. A selection of a property is received and the value of the selected property for the object is determined. The method further includes the step of generating a status indicator based on the value of the selected property. The status indicator is then displayed relative to the object. In a preferred embodiment, the form of the status indicator is automatically determined by the system. An apparatus for implementing the method is also disclosed.

29 Claims, 6 Drawing Sheets

U.S. PATENT DOCUMENTS

| | | | |
|---|---|---|---|
| 3,599,033 A * | 8/1971 | Stettiner et al. | 315/384 |
| 4,464,543 A | 8/1984 | Kline et al. | 379/224 |
| 4,626,892 A | 12/1986 | Nortrup et al. | 348/569 |
| 4,665,494 A | 5/1987 | Tanaka et al. | 702/77 |
| 4,881,197 A | 11/1989 | Fischer | 715/530 |
| 4,937,037 A * | 6/1990 | Griffiths et al. | 345/36 |
| 4,965,752 A | 10/1990 | Keith | 345/427 |
| 4,977,390 A | 12/1990 | Saylor et al. | 340/521 |
| 5,233,687 A | 8/1993 | Henderson, Jr. et al. | 715/804 |
| 5,261,044 A | 11/1993 | Dev et al. | 715/855 |
| 5,271,058 A | 12/1993 | Andrews et al. | 379/265.11 |
| 5,271,063 A | 12/1993 | d'Alayer de Costemore d'Arc | 381/104 |
| 5,295,244 A * | 3/1994 | Dev et al. | 715/853 |
| 5,303,388 A * | 4/1994 | Kreitman et al. | 715/836 |
| 5,353,399 A | 10/1994 | Kuwamoto et al. | 715/736 |
| 5,367,670 A | 11/1994 | Ward et al. | 714/47 |
| 5,394,522 A | 2/1995 | Sanchez-Frank et al. | 715/735 |
| 5,408,218 A | 4/1995 | Svedberg et al. | 340/507 |
| 5,408,603 A * | 4/1995 | Van de Lavoir et al. | 715/763 |
| 5,437,009 A * | 7/1995 | Lane | 345/636 |
| 5,440,688 A | 8/1995 | Nishida | 714/4 |
| 5,444,849 A | 8/1995 | Farrand et al. | 709/237 |
| 5,471,399 A * | 11/1995 | Tanaka et al. | 716/11 |
| 5,483,631 A | 1/1996 | Nagai et al. | 715/736 |
| 5,486,457 A * | 1/1996 | Butler et al. | 435/7.2 |
| 5,495,607 A | 2/1996 | Pisello et al. | 395/600 |
| 5,500,934 A | 3/1996 | Austin et al. | 715/853 |
| 5,504,921 A | 4/1996 | Dev et al. | 395/800 |
| 5,509,123 A | 4/1996 | Dobbins et al. | 709/243 |
| 5,535,403 A | 7/1996 | Li et al. | 715/853 |
| 5,586,254 A | 12/1996 | Kondo et al. | 714/25 |
| 5,586,255 A | 12/1996 | Tanaka et al. | 709/223 |
| 5,631,825 A * | 5/1997 | van Weele et al. | 700/83 |
| 5,634,122 A | 5/1997 | Loucks et al. | 707/8 |
| 5,650,814 A | 7/1997 | Florent et al. | 348/39 |
| 5,655,081 A | 8/1997 | Bonnell et al. | 709/202 |
| 5,666,477 A * | 9/1997 | Maeda | 345/440 |
| 5,671,381 A | 9/1997 | Strasnick et al. | 715/848 |
| 5,682,487 A | 10/1997 | Thomson | 715/800 |
| 5,684,967 A | 11/1997 | McKenna et al. | 715/853 |
| 5,696,486 A | 12/1997 | Poliquin et al. | 340/506 |
| 5,696,892 A | 12/1997 | Redmann et al. | 395/125 |
| 5,699,403 A | 12/1997 | Ronnen | 379/15.04 |
| 5,745,692 A | 4/1998 | Lohmann, II et al. | 395/200.53 |
| 5,748,098 A | 5/1998 | Grace | 370/242 |
| 5,748,884 A | 5/1998 | Royce et al. | 714/57 |
| 5,751,965 A | 5/1998 | Mayo et al. | 709/224 |
| 5,761,502 A | 6/1998 | Jacobs | 707/103 R |
| 5,768,501 A | 6/1998 | Lewis | 714/48 |
| 5,774,669 A | 6/1998 | George et al. | 709/224 |
| 5,787,252 A | 7/1998 | Schettler et al. | 709/224 |
| 5,793,974 A | 8/1998 | Messinger | 709/224 |
| 5,796,951 A | 8/1998 | Hamner et al. | 709/223 |
| 5,801,707 A | 9/1998 | Rolnik et al. | 715/853 |
| 5,802,383 A | 9/1998 | Li et al. | 345/420 |
| 5,805,819 A | 9/1998 | Chin et al. | 709/224 |
| 5,809,265 A | 9/1998 | Blair et al. | 715/764 |
| 5,812,750 A | 9/1998 | Dev et al. | 714/4 |
| 5,832,503 A | 11/1998 | Malik et al. | 709/223 |
| 5,857,190 A | 1/1999 | Brown | 707/10 |
| 5,867,650 A | 2/1999 | Osterman | 709/203 |
| 5,872,911 A | 2/1999 | Berg | 714/43 |
| 5,933,601 A | 8/1999 | Fanshier et al. | 709/223 |
| 5,941,996 A | 8/1999 | Smith et al. | 714/47 |
| 5,948,060 A | 9/1999 | Gregg et al. | 709/212 |
| 5,956,028 A | 9/1999 | Matsui et al. | 715/757 |
| 5,958,012 A | 9/1999 | Battat et al. | 709/224 |
| 5,963,886 A * | 10/1999 | Candy et al. | 702/61 |
| 5,987,376 A | 11/1999 | Olson et al. | 701/201 |
| 6,000,045 A | 12/1999 | Lewis | 714/47 |
| 6,008,820 A | 12/1999 | Chauvin et al. | 345/502 |
| 6,011,838 A | 1/2000 | Cox | 379/112.06 |
| 6,012,984 A | 1/2000 | Roseman | 463/42 |
| 6,021,262 A | 2/2000 | Cote et al. | 714/48 |
| 6,029,177 A | 2/2000 | Sadiq et al. | 707/201 |
| 6,035,324 A | 3/2000 | Chang et al. | 709/203 |
| 6,049,828 A | 4/2000 | Dev et al. | 709/224 |
| 6,052,722 A | 4/2000 | Taghadoss | 709/223 |
| 6,057,757 A | 5/2000 | Arrowsmith et al. | 340/506 |
| 6,058,494 A | 5/2000 | Gold et al. | 714/42 |
| 6,061,714 A | 5/2000 | Housel, III et al. | 709/203 |
| 6,070,184 A | 5/2000 | Blount et al. | 709/200 |
| 6,073,099 A | 6/2000 | Sabourin et al. | 704/256.6 |
| 6,085,256 A | 7/2000 | Kitano et al. | 719/315 |
| 6,094,195 A * | 7/2000 | Clark et al. | 715/839 |
| 6,108,782 A | 8/2000 | Fletcher et al. | 713/153 |
| 6,112,015 A * | 8/2000 | Planas et al. | 709/223 |
| 6,125,390 A | 9/2000 | Touboul | 709/223 |
| 6,131,118 A | 10/2000 | Stupek, Jr. et al. | 709/223 |
| 6,141,777 A | 10/2000 | Cutrell et al. | 714/47 |
| 6,154,212 A | 11/2000 | Eick et al. | 715/848 |
| 6,154,849 A | 11/2000 | Xia | 714/4 |
| 6,161,082 A | 12/2000 | Goldberg et al. | 704/3 |
| 6,167,448 A | 12/2000 | Hemphill et al. | 709/224 |
| 6,185,613 B1 | 2/2001 | Lawson et al. | 709/224 |
| 6,192,365 B1 | 2/2001 | Draper et al. | 707/101 |
| 6,202,085 B1 | 3/2001 | Benson et al. | 709/205 |
| 6,209,033 B1 * | 3/2001 | Datta et al. | 709/224 |
| 6,222,547 B1 * | 4/2001 | Schwuttke et al. | 345/419 |
| 6,237,006 B1 * | 5/2001 | Weinberg et al. | 707/103 R |
| 6,260,158 B1 | 7/2001 | Purcell et al. | 714/10 |
| 6,271,845 B1 * | 8/2001 | Richardson | 715/764 |
| 6,288,650 B2 * | 9/2001 | Chavand | 340/679 |
| 6,298,378 B1 | 10/2001 | Angal et al. | 709/223 |
| 6,366,284 B1 * | 4/2002 | McDonald | 345/440 |
| 6,373,505 B1 * | 4/2002 | Bellamy et al. | 715/772 |
| 6,374,293 B1 * | 4/2002 | Dev et al. | 709/220 |
| 6,404,444 B1 * | 6/2002 | Johnston et al. | 715/839 |
| 6,421,707 B1 | 7/2002 | Miller et al. | 709/206 |
| 6,456,306 B1 * | 9/2002 | Chin et al. | 715/810 |
| 6,496,209 B2 * | 12/2002 | Horii | 715/853 |
| 6,546,425 B1 | 4/2003 | Hanson et al. | 709/227 |
| 6,577,323 B1 * | 6/2003 | Jamieson et al. | 715/700 |
| 6,587,108 B1 * | 7/2003 | Guerlain et al. | 345/440 |
| 6,603,396 B2 | 8/2003 | Lewis et al. | 340/506 |
| 6,614,433 B1 * | 9/2003 | Watts | 345/440 |
| 6,639,614 B1 * | 10/2003 | Kosslyn et al. | 715/837 |
| 6,661,434 B1 * | 12/2003 | MacPhail | 715/772 |
| 6,704,874 B1 | 3/2004 | Porras et al. | 726/22 |
| 6,707,795 B1 | 3/2004 | Noorhosseini et al. | 370/242 |
| 6,711,154 B1 | 3/2004 | O'Neal | 370/352 |
| 6,732,170 B2 | 5/2004 | Miyake et al. | 709/223 |
| 6,738,809 B1 * | 5/2004 | Brisebois et al. | 709/224 |
| 6,744,446 B1 | 6/2004 | Bass et al. | 715/734 |
| 2001/0042118 A1 | 11/2001 | Miyake et al. | 709/223 |
| 2001/0044840 A1 | 11/2001 | Carleton | 709/223 |
| 2003/0046390 A1 | 3/2003 | Ball et al. | 709/224 |
| 2003/0069952 A1 | 4/2003 | Tams et al. | 709/223 |
| 2004/0210469 A1 | 10/2004 | Jones et al. | 705/8 |
| 2005/0078692 A1 | 4/2005 | Gregson | 370/401 |

FOREIGN PATENT DOCUMENTS

| | | |
|---|---|---|
| WO | WO 95/27249 | 10/1995 |
| WO | WO 99/15950 | 4/1999 |

OTHER PUBLICATIONS

Lazar, et al., Exploiting Virtual Reality for Network Management, Singapore ICCS/ISITA, IEEE, pp. 979-983, 1992.

Feiner, et al., A virtual World for Network Management, Proc. VRAIS '93, Seattle, WA, IEEE, pp. 55-61, Oct. 18-22, 1993.

Crutcher, et al., Management and Control for Giant Gigabit Networks, IEEE Network, pp. 62-71, Nov. 1993.

Crutcher, et al., Managing Networks Through a Virtual World, IEEE Parallel & Distributed Technology, pp. 4-13, 1995.

Stafford, J., Client-Server's Missing Link (Applications Management), VARbusiness, vol. 12, No. 2, pp. 133-138, Feb. 1, 1996.

Chan, et al., A Platform for Real-Time Visualization and Interactive Simulation of Large Multimedia Networks, Proceedings of the 4th IEEE International Workshop on Parallel and Distributed Real-Time Systems, pp. 1-7, Apr. 1996.

Lamm, et al., Real-Time Geographic Visualization of World Wide Web Traffic, Fifth International World Wide Web Conference, pp. 1-17, May 6-10, 1996.

Microsoft Press Computer Dictionary, p. 92, 1997.

Computer Dictionary, 3rd ed., Microsoft Press, p. 359, 1997.

Computer Associates, Unicenter Console Management for Open VMS, Enterprise Management, 7 pages, 2002.

European Patent Office Communication for Application No. 02713722.3—2205, 5 pages, Jun. 16, 2006.

European Patent Office Communication pursuant to Article 96(2) EPC for Application No. 02 715 024.2—1225, 8 pages, Jun. 27, 2006.

European Patent Office Communication pursuant to Article 96(2) EPC for Application No. 02 706 491.4—1225, 5 pages, Oct. 23, 2006.

Examiner's First Report on Patent Application No. 2002240575 by Computer Associates Think, Inc.; 2 pages, Feb. 2, 2007.

PCT International Preliminary Examination Report; International Application No. PCT/US02/06444; 5 pages, Jan. 22, 2003.

*USPTO Office Action Summary* for U.S. Appl. No. 10/091,067 filed Mar. 4, 2002; 18 pages.

*USPTO Office Action Summary* for U.S. Appl. No. 09/949,101 filed Sep. 7, 2001; 19 pages.

* cited by examiner

METHOD AND APPARATUS FOR DISPLAYING 3-D STATE INDICATORS

RELATED APPLICATIONS

This application claims priority to U.S. Provisional Ser. Nos. 60/241,049 and 60/241,051 both filed Oct. 17, 2000. Further, this application is a Continuation-in-Part of co-pending U.S. application Ser. No. 09/949,101 entitled "Network Management System Using Virtual Reality Techniques to Display and Simulate Navigation to Network Computers" filed Sep. 7, 2001, which is a Continuation of U.S. application Ser. No. 09/408,213 entitled "Network Management System Using Virtual Reality Techniques to Display and Simulate Navigation to Network Components" filed Sep. 27, 1999 (now U.S. Pat. No. 6,289,380), which is a Continuation of U.S. application Ser. No. 08/892,919 entitled "Network Management System Using Virtual Reality Techniques to Display and Simulate Navigation to Network Components" filed Jul. 15, 1997 (now U.S. Pat. No. 5,958,012), which claims priority to U.S. Provisional Ser. No. 60/021,980 filed on Jul. 18, 1996. This application is further related to co-pending U.S. application Ser. No. 09/558,897 entitled "Method and Apparatus for Predictively and Graphically Administering a Networked Computer System in a Time Dimension" filed Apr. 26, 2000, and U.S. application Ser. No. 09/559,237 entitled "Method and Apparatus for Maintaining Data Integrity Across Distributed Computer Systems" filed Apr. 26, 2000. Except for U.S. application Ser. Nos. 09/408,213 and 08/892,919 and U.S. Provisional Ser. No. 60/021,980, each of the previously mentioned applications is hereby incorporated by reference in its entirety. The concurrently filed U.S. Non-Provisional Application entitled "Method and Apparatus for Displaying 3D State Indicators" is also incorporated herein by reference.

TECHNICAL FIELD

The present system is in the field of systems and articles of manufacture to administer and analyze complex, heterogeneous networked computer systems and other systems that can be monitored by computer technology. More specifically, the present system is directed to systems and articles for enabling user selection and presentation of a property of an object in a three dimensional graphic display.

BACKGROUND

In known system management applications, the visualization of the contents, configuration, and state of the managed system is usually based on some form of display, ranging from a list of items, to icons arrayed in some meaningful way, to 2-D diagrams, to 3-D views. The type of each object may be indicated with an icon of some sort, while the identity and/or state of the object is often rendered in text form. Variations on these themes exist, such as displays that are completely textual and those that use no text at all, but common to all such systems is a core display that shows the objects under management and their relationships.

Using 3-D visualization to render objects conveys a more realistic view of managed objects and their configuration. However, one problem with such a technique is that system management applications typically only show 3-D images of the basic description of the objects, such as their type and inter-connectivity. Another problem is that common system management applications only show fixed properties of the managed objects.

To show the general state of the managed objects, which may include values of their properties, such as state, load, error rate, integrity, and available capacity, known systems typically use some form of visualization appropriate to the metrics of interest. For example, to show the status of the object, an indicator of its essential health, ranging from NORMAL to CRITICAL and also taking on values such as UNKNOWN, it is common to use color, where green might indicate NORMAL, red might indicate CRITICAL and gray or black indicate UNKNOWN.

In real-world displays, it is not practical to surface all the information about the managed object in this core 3-D display. Although some applications have attempted to do this by displaying textual information on planes in 3-D, such displays are harder to read than plain 2-D text because of the limited resolution of current equipment and because current systems do not have enough computational power to anti-alias text or other graphical elements in real time. If this much information is desired, using a 2-D visualization model is considered superior. The benefits of 3-D views appear to be best gained by employing 3-D metaphors.

Some systems generate 3-D bar charts, usually standing on a plane in a regular grid. However, these bar charts have many problems. Most notably, the bars appear to be standing on a totally abstract floor plane, not one that represents the real-world objects interconnected through network links. In addition, such general charting systems are based on collected statistics, and not on real-time monitoring measurements coming out of a management system.

In order to show the other very important and detailed information about the managed objects in a practical way, it is commonplace to provide some mechanism for "drilling down," thereby retrieving more detailed information about the object from an information store, using a conventional user interface. For example, in network and systems management systems, it is common to surface status in the core display but provide performance and load indicators in other displays that may be brought up from the core display.

Unfortunately, these arrangements have some disadvantages. When additional information is brought up in secondary displays, the secondary displays deviate from the normal navigation conventions of the core 3-D display. In this situation, to see the secondary data on various management objects, it is necessary to first navigate to them, then bring up the secondary display, then navigate to other objects and bring up their secondary displays. Using such an interface is not only cumbersome, but it also impedes a user's ability to compare properties of several objects at once.

In addition, fixed arrangements of this type may not suit every user. For example, while many users may be primarily interested in status and consider load secondary, the person in charge of managing load balancing across the network may be more interested in instantaneous load displays.

Some system management applications provide for customizing the display in two areas. The information displayed in conjunction with the icon in typical displays may be selected from the properties of the objects, so that the icon shows various pieces of information in the form of text, color or other ways. Alternatively, moving the mouse cursor over a symbol in the display may bring up a configurable reticule with labeling, again displaying different properties. This customization is often done specific to each class of object, so different information is displayed about a server and a router, for example. However, this type of configuration is typically static, requiring the user to enter some sort of configuration utility. No known system provides a real time configuration of the display.

SUMMARY

In accordance with the disclosed system, a first method for presenting a status of an object in a three dimensional graphic display is disclosed. The method includes the step of determining a value of a property associated with an object. The method further includes the step of determining a status indicator associated with the property. A status indicator is then generated representing the property associated with the object, and displayed relative to the associated object. In accordance with the disclosed system, a second method for presenting a user selected status of an object in a three dimensional graphic display is disclosed. The method includes the steps of receiving a request to select a property of an object for display and displaying at least one property which may be displayed for the object. The method further includes the step of receiving a selection of a property. The value of the selected property for the object is determined and a status indicator is generated based on the value of the selected property. The status indicator is then displayed relative to the object.

The objects, features and advantages of the disclosed method and system are readily apparent from the following description of the preferred embodiments when taken in connection with the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION

Figure 1:
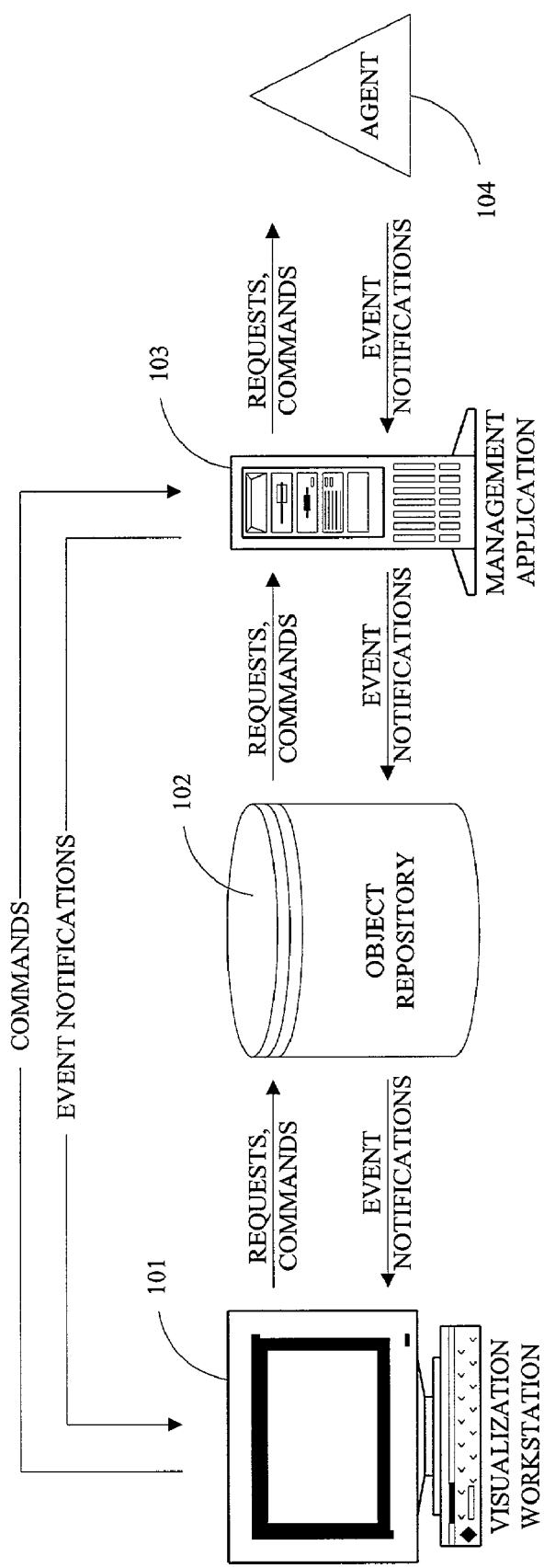
FIG. 1 illustrates a system according to a preferred embodiment of the present system.

The various components that comprise a preferred embodiment of the disclosed network analysis system are shown in FIG. 1. The system includes one or more of a visualization workstation 101, an object repository 102, one or more management applications 103, and one or more agents 104 on each such management application. The visualization workstation 101 interacts primarily with the object repository 102. It requests information from it, it sends commands to it, and it gets notification of events such as status change or object additions from it. The repository 102 in turn gets this information form the various management subsystems 103, which are fed by agents 104 on the managed systems. An important architectural consideration of the present system is that in normal operation, the visualization workstation 101 preferably interacts with the object repository 102. This minimizes network traffic, optimizes the performance of the rendering of the workstation, and minimizes the interconnectivity between the visualization workstation 101 and the multitude of management subsystems and agents existing in practical networks.

Preferably, the management system is based on some type of store, preferably the object repository 102, that holds the description of the structure of the network. This can include the momentary state, load, and performance of the network and the systems. This store may or may not be persistent, it may be populated with a manual process, or with an automatic discovery utility.

Figure 2:
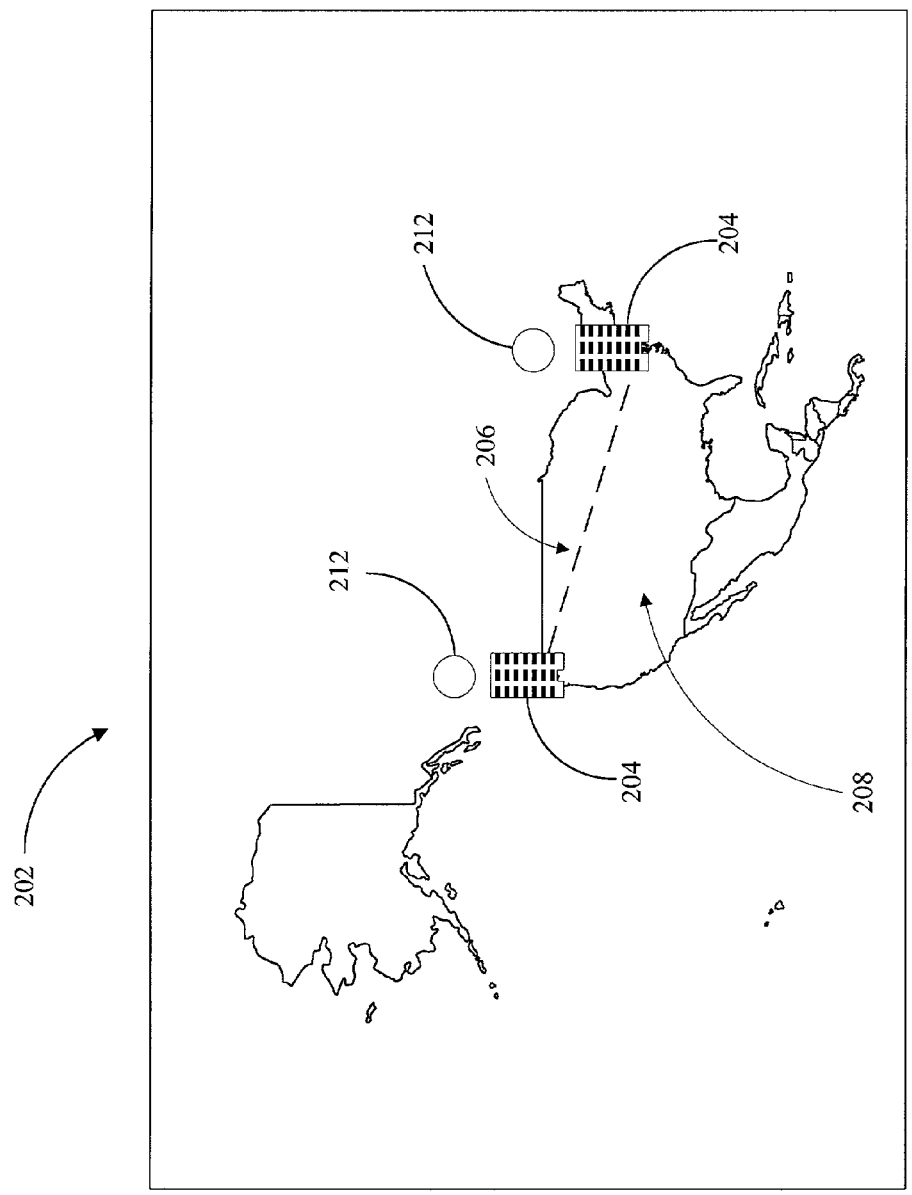
FIG. 2 illustrates a display of the representation of a networked computer system or complex business operation according to a preferred embodiment of the present system.

According to a preferred embodiment of the present system, as shown in FIG. 2, a management system outputs a display 202 of the managed objects using 3-D models 204 of real-world objects, configured in suitable positions over 3-D sections 208 of a 3-D surface, and interconnected with at least one line 206 that shows a network link, where optional links are shown as dots and dashed lines. The status of each object 204 is indicated with a hovering light 212, whose color indicates status from green through yellow, orange and red. The status of network link 206 may be indicated by coloring the link itself.

Figure 3:
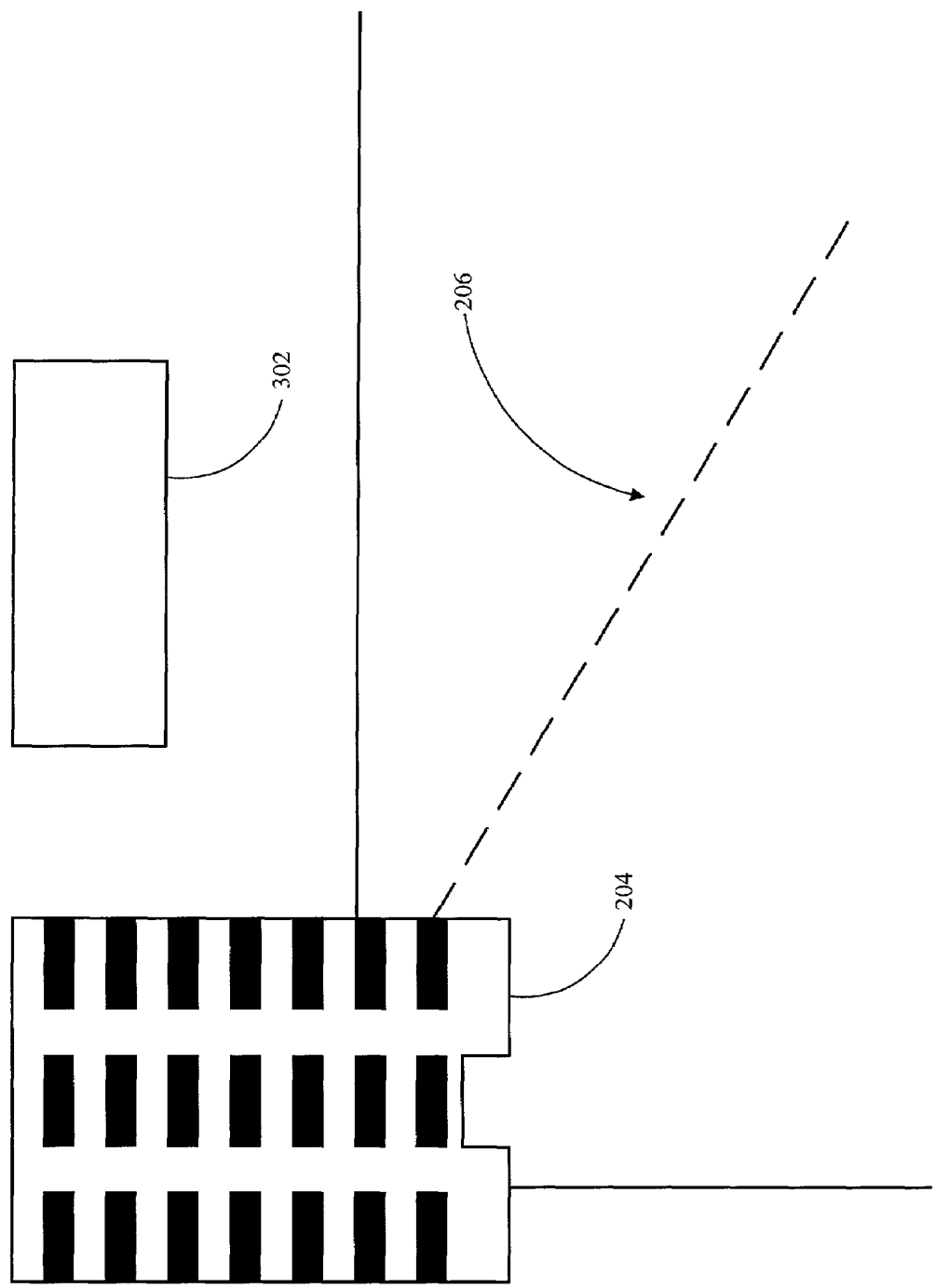
FIG. 3 illustrates a section of the display in FIG. 2 with an additional information display according to a preferred embodiment of the present system.

Turning to FIG. 3, a more detailed view of the display 202 in FIG. 2 is shown. As seen in FIG. 3, according to a preferred embodiment of the present system the system generates additional objects 302, such as a vertical bar, next to each representation 204 of a "real-world" object. The present system uses these additional objects 302 to indicate in real time quantitative or qualitative measures of the managed objects.

Figure 4:
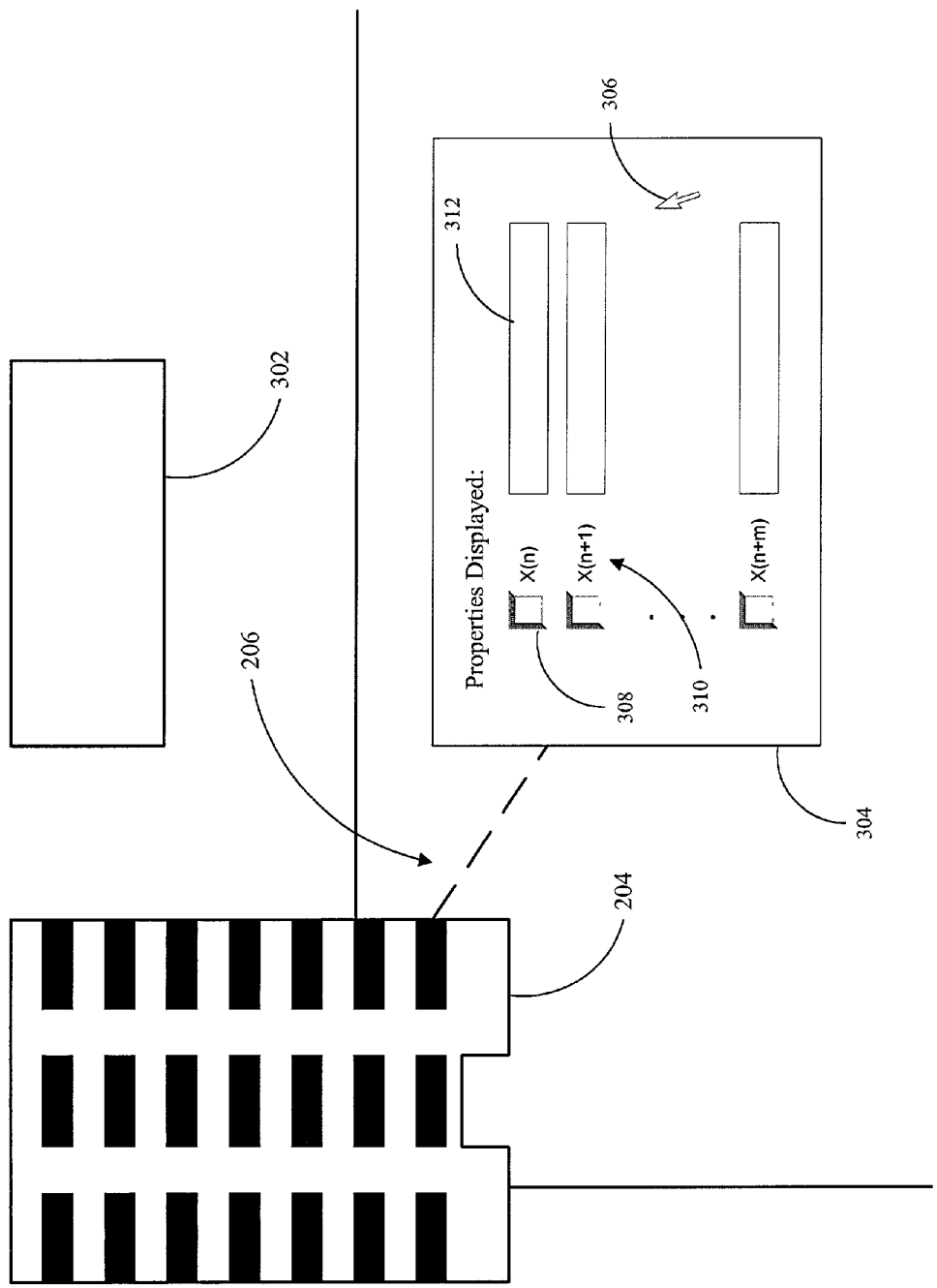
FIG. 4 illustrates a section of the display in FIG. 2 with an additional information display and user interface according to a preferred embodiment of the present system.

As seen in FIG. 4, an alternative preferred embodiment includes an indicator section 302 that displays other indicators in the core display 202. In this and other alternative preferred embodiments of the disclosed system, the indicator section 302 can include color, animation effects, icon choice, text, bar, line or pie charts near the managed object, and others. The managed objects 204 have a set of properties, some numeric, some textual, and some categorical. Current system management applications support surfacing some fixed set of properties in the core display using fixed indicators, but other properties must be brought up through an explicit request, after which they are visualized using a technique determined by the application.

To overcome these problems, the preferred embodiment of the disclosed system provides an interface 304, preferably a property selection control panel, that permits a user to select properties the user desires to monitor in the indicator section 302 using predetermined indicators. In other embodiments, the user may select a type of indicator to be used from a menu of indicators, such as for example bar graph, indicator light and pie chart.

A user can interact with interface 304 by point-and-click operations after placing a cursor 306 over a box 308, or any similar configuration or arrangement, in the interface 304. After clicking on the box 308, the area chosen by the user is correlated to a predetermined property to be displayed $X_n$ through $X_{n+m}$ 310, where n and m are integers. In use, $X_n$ through $X_{n+m}$ are textual representations of the available properties. Thus, in the preferred embodiment of the disclosed system, the indicators 310 are the actual textual names of the properties chosen. Preferably, all properties, are visualized in a standard way after being explicitly requested, so there is no need for customization of the secondary displays.

In the preferred embodiment, after a user interacts with the control panel 304, there is an immediate effect to the indicator section 302 in the display 202, without requiring any complex settings in a dialog box, a confirmation dialog, or even pressing an OK button, which would break the flow of the operation and distract the user from the information displayed.

Further, the property selection control panel 304 preferably acts as an indicator of what information is currently displayed. In the preferred embodiment, distinct indicators for the various types of information are used through bars 312, preferably a yellow-orange-red color range indicates status and shades of blue indicate load. In this way, a knowledgeable user can immediately tell, by looking at the control panel 304 in the display 202, what information is currently displayed. In the preferred embodiment, the control panel 304 shows the current indicators, such as colors or animation effects, as well as the corresponding property, identified by name. Providing both a textual description of the properties and their corresponding visual displays in control panel 304 assists a novice user who may know the meanings of the various visual displays employed by the system.

Figure 5:
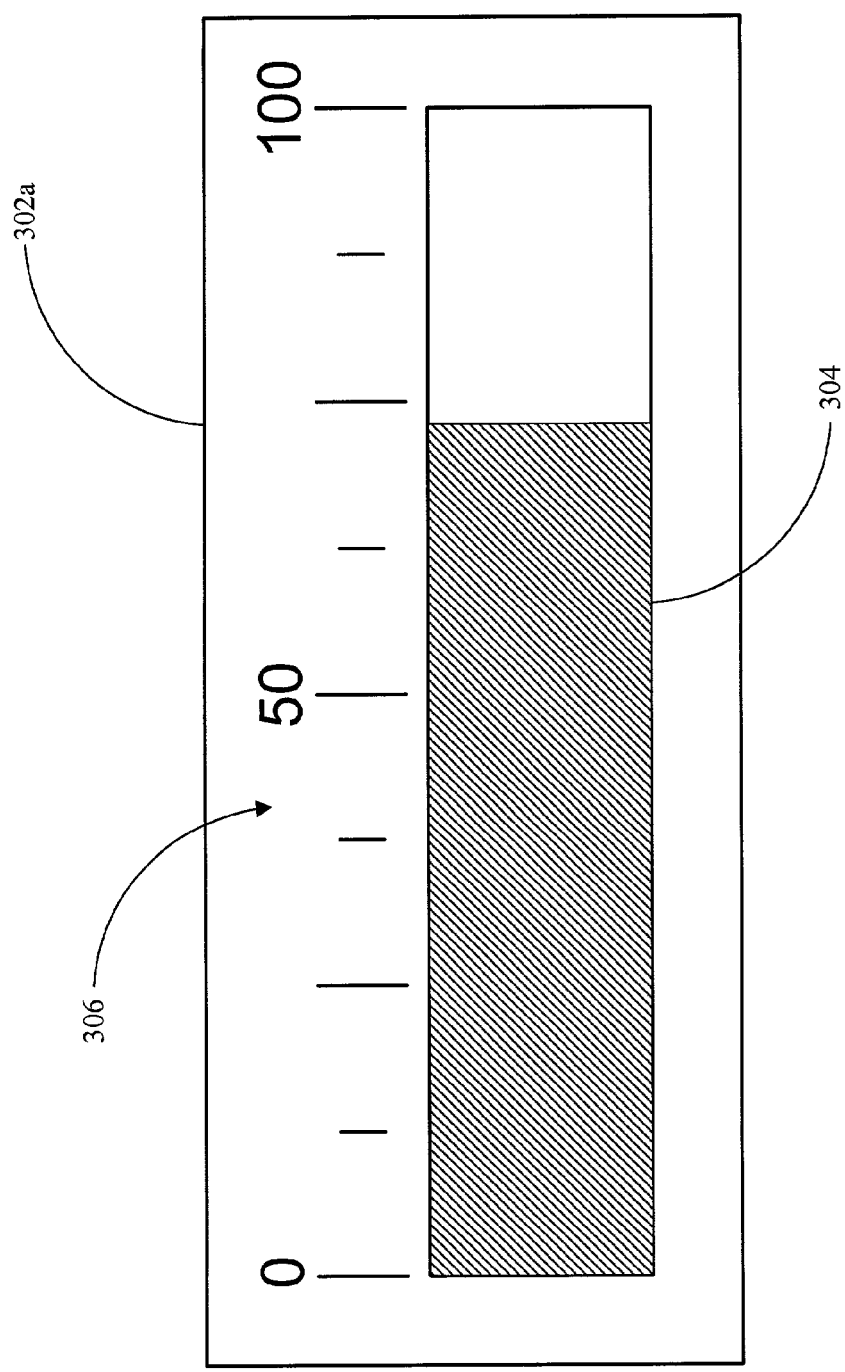
FIG. 5 illustrates a section of the additional information display of FIG. 3 according to a preferred embodiment of the present system.

For example, as seen in FIG. 5, to indicate the real time percentage load of a computer system, the additional object 302a can be a solid bar 304 that reaches up to a corresponding percentage within an empty, transparent bar. In some ways, this resembles a conventional bar chart, with the percentage scale 306 on an x axis above the bar 304, but combined with a 3-D display 202 of real-world objects that are arranged in a way that represents the real-world configuration of these managed objects.

According to a preferred embodiment of the present system, indicator 302 is made translucent. This avoids making the visualization 302 unreadable due to the large number of objects 204 and their quantitative indicators 302, such as the bars 304. The effect is that of "colored water" reaching up to a certain level in a "glass aquarium tank." The colored area that represents the actual traffic load or performance is colored fairly solidly, just translucent enough to indicate the distinction between this quantitative measure and the real-world objects, and to prevent the quantitative measures from obstructing the view of other objects. The empty part of the tank, representing capacity of the system that is currently not exploited, is almost entirely transparent, rendered just opaque enough to give an impression of a glass tank.

In addition, in alternative preferred embodiments of the present system, the system uses other advanced visualization techniques, such as reflections in the "glass surfaces" and the "edges of the glass tank" to increase the perceived realism and reduce the visual clutter between the managed objects 204 and the quantitative indicators 302.

Figure 6:
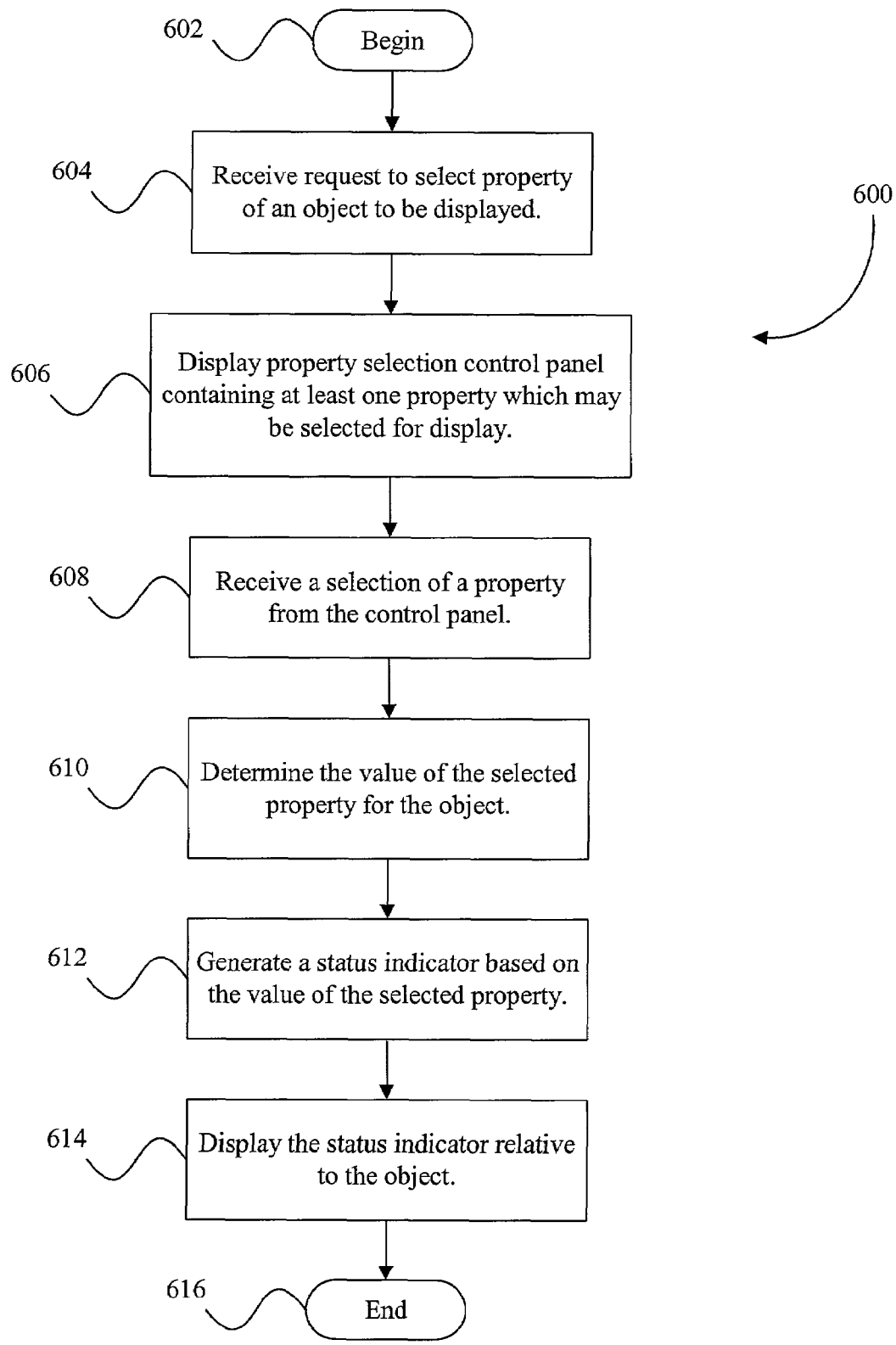
FIG. 6 illustrates a flow chart of a method according to a preferred embodiment of the present system.

In FIG. 6, a preferred method 600 is shown. The method starts at 602, after which a request is received to select a property of an object to be displayed at 604. This request is preferably initiated by a user indicating that the user wishes to customize the display, for example by double-clicking on an object or by right-clicking on an object and making a menu selection.

At step 606, the property selection control panel is displayed. The control panel contains at least one property which may be selected for display. A selection of a property from the control panel is received at step 608. The value of the selected property for the object is determined at 610. This determination is preferably performed in real-time with reference to data contained in object repository 102. A status indicator is generated based on the determined value of the selected property at step 612, and the status indicator is displayed at step 614.

Accordingly, it is to be understood that the drawings and description in this disclosure are proffered to facilitate comprehension of the system, and should not be construed to limit the scope thereof It should be understood that various changes, substitutions and alterations can be made without departing from the spirit and scope of the system.

What is claimed is:

1. A method for presenting a status of an object in a graphic display, comprising:
    displaying a plurality of icons, wherein:
        the icons are associated with a plurality of objects;
        the icons are three-dimensional graphical models of the associated objects; and
        the icons are arranged according to locations of the associated objects as deployed in a network;
    displaying a control panel associated with a particular icon that represents a particular object, wherein the control panel comprises a plurality of properties;
    in response to a selection of at least one of the plurality of properties, determining a value of the at least one property associated with the particular object;
    generating a status indicator representing the determined value; and
    displaying the status indicator.

2. The method of claim 1, wherein the status indicator has a translucent quality.

3. The method of claim 1, wherein the status indicator has a reflective quality.

4. The method of claim 1, wherein the status indicator is depicted as a bar.

5. The method of claim 4, wherein at least one dimension of the bar represents the determined value.

6. The method of claim 1, wherein the status indicator is depicted as a quantitative indicator.

7. The method of claim 6, wherein the quantitative indicator is a gauge.

8. A method for presenting a user selected status of an object in a graphic display, comprising:
    displaying a plurality of icons, wherein:
        the icons are associated with a plurality of objects;
        the icons are three-dimensional graphical models of the associated objects; and
        the icons are arranged according to locations of the associated objects as deployed in a network;
    receiving a request to select a property of a particular object for display;
    displaying a control panel associated with a particular icon that represents the particular object, wherein the control panel comprises a plurality of properties;
    in response to a selection of at least one of the plurality of properties, determining a value of the at least one selected property;
    generating a status indicator based at least in part on the determined value of the at least one selected property; and
    displaying the status indicator.

9. The method of claim 8, wherein generating a status indicator comprises automatically determining a form of the status indicator.

10. The method of claim 8, further comprising receiving a selection from a user determining a form of the status indicator.

11. The method of claim 8, wherein the status indicator is a bar graph.

12. An apparatus for presenting a status of an object in a graphic display, comprising:
a graphical user interface operative to:
displaying a plurality of icons, wherein:
the plurality of icons are associated with a plurality of objects;
the icons are three-dimensional graphical models of the associated objects; and
the icons are arranged according to locations of the associated objects as deployed in a network; and
display a control panel associated with a particular icon that represents a particular object, wherein the control panel comprises a plurality of properties; and
a processor operative to:
in response to a selection of at least one of the plurality of properties, determine a value of a the at least one property associated with the particular object; and
generate a status indicator representing the determined value, wherein the status indicator is displayed in association with the particular icon.

13. An apparatus for presenting a user selected status of an object in a graphic display, comprising:
a graphical user interface operative to display a plurality of icons, wherein:
the icons are associated with a plurality of objects;
the icons are three-dimensional graphical models of the associated objects; and
the icons are arranged according to locations of the associated objects as deployed in a network; and
a processor operative to:
receive a request to select a property of a particular object for display;
display at least one property associated with the particular object a control panel associated with a particular icon that represents the particular object; wherein the control panel comprises a plurality of properties;
in response to a selection of at least one of the plurality of properties, determine a value of the at least one selected property; and
generate a status indicator based at least in part on the determined value of the at least one selected property, wherein the status indicator is displayed in association with the particular icon.

14. An apparatus for presenting a status of an object in a graphic display, comprising:
means for displaying:
a plurality of icons, wherein:
the icons are associated with a plurality of objects;
the icons are three-dimensional graphical models of the associated objects; and
the icons are arranged according to locations of the associated objects as deployed in a network; and
a control panel associated with a particular icon that represents a particular object, wherein the control panel comprises a plurality of properties;
means for determining, in response to a selection of at least one of the plurality of properties, a value of the at least one selected property associated with the particular object;
means for generating a status indicator representing the determined value; and
means for displaying the status indicator.

15. An apparatus for presenting a user selected status of an object in a graphic display, comprising:
means for displaying a plurality of icons, wherein:
the icons are associated with a plurality of objects;
the icons are three-dimensional graphical models of the associated objects; and
the icons are arranged according to locations of the associated objects as deployed in a network;
means for receiving a request to select a property of a particular object for display;
means for displaying a control panel associated with a particular icon that represents the particular object, wherein the control panel comprises a plurality of properties;
means for receiving a selection of at least one of the plurality of properties;
means for determining a value of the at least one selected property;
means for generating a status indicator based at least in part on the determined value of the at least one selected property; and
means for displaying the status indicator.

16. A computer-readable storage medium encoded with processing instructions for implementing a method for presenting a status of an object in a graphic display, the processing instructions operable when executed to direct a computer to perform the steps of:
displaying a plurality of icons, wherein:
the icons are associated with a plurality of objects;
the icons are three-dimensional graphical models of the associated objects; and
the icons are arranged according to locations of the associated objects as deployed in a network;
displaying a control panel associated with a particular icon that represents a particular object, wherein the control panel comprises a plurality of properties;
in response to a selection of at least one of the plurality of properties, determining a value of a the at least one property associated with the particular object;
generating a status indicator representing the determined value; and
displaying the status indicator.

17. A computer-readable storage medium encoded with processing instructions for implementing a method for presenting a user selected status of an object in a graphic display, the processing instructions operable when executed to direct a computer to perform the steps of:
displaying a plurality of icons, wherein:
the icons are associated with a plurality of objects;
the icons are three-dimensional graphical models of the associated objects; and
the icons are arranged according to locations of the associated objects as deployed in a network;
receiving a request to select a property of a particular object for display;
displaying control panel associated with a particular icon that represents the particular object, wherein the control panel comprises a plurality of properties;
in response to a selection of at least one of the plurality of properties, determining a value of the at least one selected property;
generating a status indicator based at least in part on the determined value of the at least one selected property; and
displaying the status indicator.

18. The method of claim 1, further comprising:
displaying lines between the icons, the lines representing network links;
determining a status associated with a particular network link; and modifying the displayed line associated with the particular network link, the modification based at least in part on the determined status.

19. The apparatus of claim 12, wherein:
the graphical user interface is further operative to display lines between the icons, the lines representing network links; and
the processor is further operative to:
   determine a status associated with a particular network link; and
   modify the displayed line associated with the particular network link, the modification based at least in part on the determined status.

20. The method of claim 1, wherein the icons are arranged on a three-dimensional graphical surface.

21. The method of claim 1, wherein the status indicator is displayed relative to the particular icon that represents the particular object.

22. The method of claim 2, wherein the translucent quality is such that a view of the displayed icons is not obstructed by the status indicator.

23. The method of claim 8, wherein the icons are arranged on a three-dimensional graphical surface.

24. The method of claim 8, wherein the status indicator is displayed relative to the particular icon that represents the particular object.

25. The apparatus of claim 12, wherein the icons are arranged on a three-dimensional graphical surface.

26. The apparatus of claim 13, wherein the icons are arranged on a three-dimensional graphical surface.

27. The method of claim 1, wherein the control panel comprises:
a respective textual description for each of the plurality of properties; and
a respective color-coded indicator for each of the plurality of properties.

28. The method of claim 1, wherein the status indicator represents:
traffic load associated with the particular object; and
unused capacity of the particular object.

29. The method of claim 1, wherein the status indicator comprises a percentage scale that is displayed in conjunction with a bar that corresponds to a percentage load of the particular object.

* * * * *